Oct. 5, 1965 W. G. RUNYAN 3,210,651

SQUARE WAVE PHASE SHIFTER

Filed March 21, 1962 2 Sheets-Sheet 1

INVENTOR.
WESLEY G. RUNYAN
BY Moody and Harris
ATTORNEYS

Oct. 5, 1965 W. G. RUNYAN 3,210,651

SQUARE WAVE PHASE SHIFTER

Filed March 21, 1962 2 Sheets-Sheet 2

INVENTOR.
WESLEY G. RUNYAN

BY Moody and Harris
ATTORNEYS

1

3,210,651

SQUARE WAVE PHASE SHIFTER

Wesley G. Runyan, Marion, Iowa, assignor to Collins Radio Company, Cedar Rapids, Iowa, a corporation of Iowa Filed Mar. 21, 1962, Ser. No. 181,335
3 Claims. (Cl. 323—108)

Figure 1:
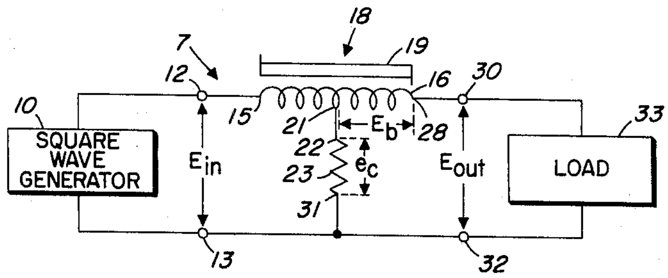

This invention relates to a square wave phase shifting network and more particularly to a network capable of receiving a square wave input signal and producing therefrom a square wave output signal that is shifted in phase with respect to the input signal without appreciable change in waveform or signal attenuation.

It is oftentimes desirable in electronic equipments that a square wave signal be shifted in phase before application in order to accomplish a desired end. Such might be the case, for example, in the regulating system of a power supply wherein both the original and a shifted square wave signal are often needed for transistor switching purposes.

While many phase shifting circuits have been proposed and utilized heretofore, these circuits have proven to be unsuitable for use in shifting a square wave signal, due, primarily, to utilization of phase sensitive elements in accomplishing the shift.

While utilization of phase sensitive elements may be acceptable for phase shifting networks designed to handle signals having basically a sinusoidal waveform, these elements cannot react properly to all of the frequency components of a square wave and hence this causes unacceptable distortion of the square wave.

In addition, many phase shifting networks are relatively complicated and elaborate, as well as requiring considerable space, and are therefore objectionable both from the standpoint of cost and space utilization.

It is therefore an object of this invention to provide a square wave shifting network that is relatively simple, compact and inexpensive to produce.

It is another object of this invention to provide a wave shifting network capable of shifting the phase of a received square wave signal without appreciable distortion or attenuation of the signal.

More particularly, it is an object of this invention to provide a square wave phase shifting network having a saturable reactor and resistance means connected so that the network acts to shift the phase of the received square wave signal without distorting the same.

Still more particularly, it is an object of this invention to provide a square wave phase shifting network having a saturable reactor with a center tapped winding and resistance means connected to said center tap whereby the saturable reactor acts as an autotransformer when unsaturated and as a conductor when saturated so that a square wave output signal is produced that is substantially identical to a received square wave input signal but shifted in phase with respect thereto.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiments of the herein disclosed invention may be included as come within the scope of the claims.

The accompanying drawings illustrate two complete examples of the embodiments of the invention constructed according to the best mode so far devised for the practical application of the principles thereof, and in which:

FIGURE 1 is a partial schematic diagram of one em-

Figure 2:
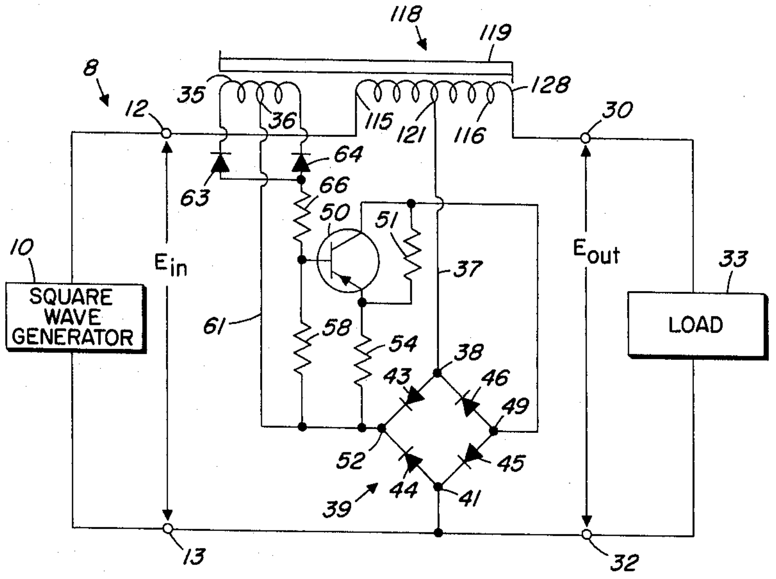
Figure 3:
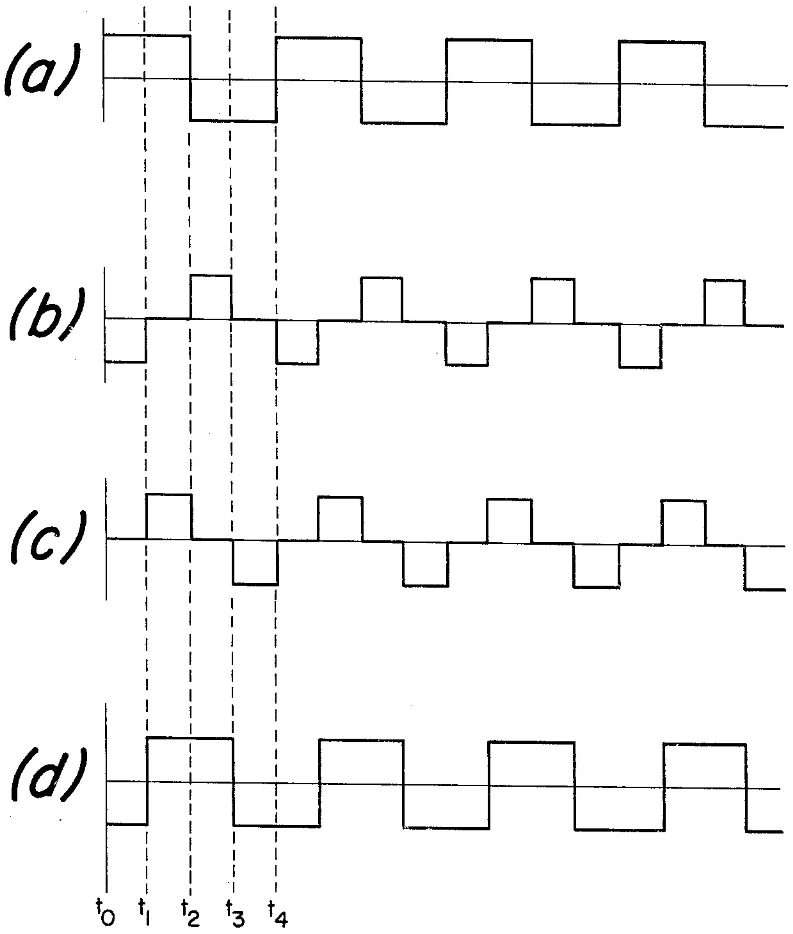

2 bodiment of the square wave shifting network of this invention;

FIGURE 2 is a partial schematic diagram of a second embodiment of the square wave shifting network of this invention; and FIGURE 3 is a presentation of typical waveforms, illustrating operation of the square phase shifting network of this invention.

Referring now to the drawings in which like numerals have been used for like characters throughout, the numeral 7 indicates generally one embodiment of the phase shifting network of this invention, as shown in FIGURE 1, while the numeral 8 refers generally to a second embodiment of the phase shifting network of this invention, as shown in FIGURE 2.

As shown in FIGURE 1, conventional square wave generating source 10 may be connected at opposite sides to input terminals 12 and 13 of the square wave phase shifting network of this invention. Input terminal 12 is connected to one end 15 of winding 16, which winding is a part of saturable reactor 18, which reactor also includes, as is common, a retentive core 19 having substantially rectangular hysteresis characteristics.

Winding 16 is center tapped, at 21, and the center tap is connected to one side 22 of voltage developing resistor 23, while the remaining end 28 of winding 16 is connected to output terminal 30.

As shown in FIGURE 1, the remaining side 31 of resistor 23 is connected in common to input terminal 13 and output terminal 32, and could, of course be connected thereto by means of a common return path such as ground. Output terminals 30 and 32, may, as is common, be connected to a load 33 to provide resistance across the output terminals.

As shown in FIGURE 2, saturable reactor 118 has a retentive core 119 with substantially rectanguar hysteresis characteristics, a winding 116, that is center tapped at 121, and a bias control winding 35 that is center tapped at 36. End 115 of winding 116 is connected to input terminal 12 in the same manner as the embodiment shown in FIGURE 1, while end 128 is connected to output terminal 30 in like manner.

As shown in FIGURE 2, lead 37 connects the center tap of winding 116 to junction 38 of a conventional diode bridge 39, which bridge, in turn has junction 41 connected to input terminal 13 and output terminal 32. As is common, diode bridge 39 consists of four diodes, 43, 44, 45 and 46 with junction 38 connecting the anode of diode 43 to the cathode of diode 46, and junction 41 connecting the anode of diode 44 to the cathode of diode 45.

Junction 49 of diode bridge 39 is directly connected to the collector of PNP type transistor 50 and is connected to the emitter of transistor 50 through biasing resistor 51, while junction 52 of diode bridge 39 is connected through resistor 54 to the emitter of transistor 50, through biasing resistor 58 to the base of transistor 50, and through lead 61 directly to the center tap of winding 35. In addition, the ends of winding 35 are connected through diodes 63 and 64 to one side of biasing resistor 66, the other side of which resistor is connected to the base of transistor 50.

Referring to the embodiment shown in FIGURE 1, a square wave input signal, as shown in FIGURE 3(*a*), may be coupled to network 7 from square wave generator 10. While core 19 of saturable reactor 18 remains unsaturated, winding 16 acts as an autotransformer. If, as shown in FIGURE 3(*a*), the positive alternation is coupled to saturable reactor 18 at time $t_0$, an output voltage $E_b$ is produced across the turns of winding 16 from the center tap to end 28. As shown in FIGURE 3(*b*), this voltage will have a negative polarity and can be so coupled from the network at output terminals 30–32, as shown in FIGURE 3(*d*).

When core 19 of saturable reactor 18 saturates, at time $t_1$ as shown in FIGURE 3, winding 16 no longer impedes current flow and thereafter acts as a conductor so that current flows through resistor 23 and develops a voltage $E_c$ thereacross. As shown in FIGURE 3(*c*), however, this voltage is of the same polarity as the input signal, and is, of course, opposite in polarity to the voltage $E_b$ developed prior to saturation of core 19. Thus, when coupled to output terminals 30–32, the voltage $E_c$ will cause the output signal to immediately switch to the positive alternation at time $t_1$, as shown by FIGURE 3(*d*), the voltage $E_b$ being essentially zero when core 19 is saturated, just as the voltage $E_c$ is essentially zero when core 19 is unsaturated and therefore impeding current flow.

Core 19 will remain saturated until the negative alternation of the input signal appears, that is, until time $t_2$ as shown in FIGURE 3. When the negative alternation is coupled to saturable reactor 18, the core now being unsaturated, winding 16 will again act as an autotransformer to develop a positive voltage $E_b$, as shown in FIGURE 3(*b*), that appears across output terminals 30–32, as shown in FIGURE 3(*d*).

When core 19 becomes saturated at time $t_3$, winding 16 again acts as a conductor and a voltage $E_c$, as shown by FIGURE 3(*c*), is developed across resistor 23. This voltage, however, is opposite in polarity to that developed after time $t_1$ because of the opposite input alternation at time $t_3$ with respect to time $t_1$, and thus the output signal is caused to switch polarity and terminates the positive output signal alternation as shown by FIGURE 3(*d*).

When the input signal switches from the negative to the positive alternation at time $t_4$, core 19 will again be unsaturated to complete the cycle. As shown in FIGURE 3(*d*), the output signal is caused to have a square wave form by careful selection of components so that the voltage $E_c$ is equal in magnitude to the voltage $E_b$.

In choosing elements for the square wave shifting network as shown in FIGURE 1, it has been found that resistor 23 should have a value equal approximately to 0.01 of the expected resistance value of applied load 33. In addition, the utilized square wave generator means 10 should have a low output impedance, preferably much less than the value of resistor 23.

The time duration of each alternation is equal to that of each alternation of the input signal, although shifted in place with respect thereto. This phase shift is determined primarily by the number of turns of center tapped winding 16. If a 90° phase shift is desired, as shown typically in FIGURE 3, the number of turns should be chosen, of course, so that the core saturates exactly at the midpoint of each alternation of the input signal.

The number of turns to be wound upon a particular core for saturation of the core at a predetermined desired time may be determined by the following formula:

$$N=\frac{\theta E_{in}}{720 B_m A f}$$

where

N=number of turns required
$\theta$=phase shift desired
$E_{in}$=input voltage
$B_m$=core saturating flux density
A=area of core
$f$=fequency of input signal The embodiment of the square wave shifting network shown in FIGURE 2 operates basically in the same manner as does that of FIGURE 1. In network 8 (FIGURE 2 embodiment), however, a transistor 50 is caused to be nonconductive when core 119 is saturated to thereby primarily develop the voltage $E_c$. Winding 35, in conjunction with the associated circuitry, is thus chosen so as to bias transistor 50 to a conductive state only until core 119 saturates, after which the transistor is maintained in a nonconductive state so long as the core remains saturated. Although somewhat more complicated than network 7 (FIGURE 1 embodiment) and requiring several additional diode elements to establish proper current flow for the transistor regardless of signal polarity, wave shifting network 8 is capable of higher effeciency than that of network 7.

From the foregoing, it should be obvious to one skilled in the art that the square wave phase shifting network of this invention provides novel means for shifting the phase of an input square wave signal without distorting the same.

What is claimed as my invention is:

1. A square wave phase shifting network, comprising: a saturable reactor having input and output windings and a core with substantially rectangular hysteresis characteristics; electron control means connected with said windings; means adapted to connect said input winding and said electron control means to a square wave signal source so that said electron control means is in a conductive state when said saturable reactor is unsaturated and in a nonconductive state when said saturable reactor is saturated; and output terminal means connected with said output winding and said electron control means for coupling a square wave signal from said network that is shifted in phase with respect to a received input square wave signal.

2. The square wave phase shifting network of claim 1 wherein said electron control means is a transistor, and wherein said saturable reactor includes a control winding connected to said transistor to bias the same to conduction only when said saturable reactor is unsaturated.

3. A square wave phase shifting network, comprising: a square wave signal source; a saturable reactor having input and output windings and a core with substantially rectangular hysteresis characteristics; means connecting one side of said input winding to one side of said square wave signal source; a diode bridge having one junction of dissimilar poles connected to said input and output windings and the other junction of dissimilar poles connected with the other side of said square wave signal source; a transistor the emitter of which is connected to one of the remaining two junctions of said diode bridge and the collector of which is connected to the other of said remaining two junctions of said diode bridge; biasing means connected to said transistor so that said transistor is in a conductive state when said reactor is unsaturated and in a nonconductive maximum resistance state when said reactor is saturated; and an output load connected to said output winding and said other junction of dissimilar poles of said diode bridge whereby the square wave signal coupled to said load from said network is shifted in phase with respect to a received input square wave signal.

References Cited by the Examiner

UNITED STATES PATENTS

| | | | |
|---|---|---|---|
| 2,593,280 | 4/52 | Elliot | 323—89 |
| 2,813,247 | 11/57 | Decker | 323—127 |

LLOYD McCOLLUM, *Primary Examiner.*

HERMAN K. SAALBACH, *Examiner.*